(12) United States Patent
Chen et al.

(10) Patent No.: US 8,717,527 B2
(45) Date of Patent: May 6, 2014

(54) METHOD FOR SEALING LIQUID CRYSTAL DISPLAY PANEL

(75) Inventors: Shyh-Feng Chen, Guandong (CN); Je-Hao Hsu, Guandong (CN); Jingfeng Xue, Guandong (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/522,285

(22) PCT Filed: Jun. 13, 2012

(86) PCT No.: PCT/CN2012/076814
§ 371 (c)(1),
(2), (4) Date: Jul. 13, 2012

(87) PCT Pub. No.: WO2013/177831
PCT Pub. Date: Dec. 5, 2013

(65) Prior Publication Data
US 2013/0321756 A1    Dec. 5, 2013

(30) Foreign Application Priority Data
May 31, 2012 (CN) .......................... 2012 1 0176524

(51) Int. Cl.
*G02F 1/1339* (2006.01)
(52) U.S. Cl.
USPC ........................................................ 349/153
(58) Field of Classification Search
USPC ........................................................ 349/153
See application file for complete search history.

(56) References Cited

U.S. PATENT DOCUMENTS

2005/0117106 A1* 6/2005 Tatemura et al. ............. 349/153
2011/0285954 A1* 11/2011 Minami ........................ 349/153

* cited by examiner

*Primary Examiner* — Lucy Chien
(74) *Attorney, Agent, or Firm* — Andrew C. Cheng

(57) ABSTRACT

The present invention discloses a method for applying sealant to seal a liquid crystal display panel, and it includes a step of deploying a sealant pattern on a first substrate. Wherein the sealant is deployed along a predetermined path of a first substrate from a starting stroke, and wherein when the final stroke of deployment of the sealant closes to the starting point, diverting the sealant inward to inner side of the first glass substrate such that a final stroke of the sealant is juxtaposed with the starting stroke of the sealant. By the disclosure of the present invention, the boarder generated by the sealant can be effectively narrowed and this is a meet to the industry trend of the liquid crystal display.

8 Claims, 4 Drawing Sheets

METHOD FOR SEALING LIQUID CRYSTAL DISPLAY PANEL

FIELD OF THE INVENTION

The present invention relates to a technology of liquid crystal display, and more particularly to a method of sealing a liquid crystal display panel in which boarder created by a sealant can be readily narrowed so as to increase active displaying area.

DESCRIPTION OF PRIOR ART

With advancement of technology, the liquid crystal display (LCD) device featured with low radiation, compact, slim and low energy exhaustion has been widely used in mobile phone, personal digital assistant, notebook computer, personal computer and television. Conventional cathode ray tube (CRT) has been gradually replaced by the liquid crystal display.

A typical liquid crystal display generally includes a pair of glass substrates married and then sealed with sealant along its peripheral boarder, and then predetermined amount of liquid crystal is filled into the space defined by the glass substrates and the sealant.

FIG. 1 is an illustrational view of a method for sealing a liquid crystal display panel. FIG. 1a illustrates a sequence for applying a sealant along peripheral boarder of the liquid crystal display; and FIG. 1b is an illustrational view showing the liquid crystal display panel after the sealant is applied. As shown in FIGS. 1a and 1b, according to the existing prior art, the sealant 12 is deployed to any one of two glass substrates 11, and then marry those two glass substrates 11 into a contained rectangular shape. The starting point and the final end of the sealant 12 are overlapped from each other so as to create a contained rectangular space.

However, as shown in FIG. 1b, during the applying of the sealant 12, the starting point and the final end have to overlap from each other. As a result, the amount of sealant used thereof is much larger as compared to other portion. As a result, additional amount of sealant will flow in and out around the beginning and final point on the glass substrates 11. As it can be readily seen from FIG. 1b, the excess sealant 12 extends outward to a certain distance b, and also extends inward with a certain distance (not labeled), as shown in FIG. 1b. In addition, because of the accuracy and tolerance, during the deployment of the sealant 12, the edge of the sealant 12 has to keep a distance "a" with respect to an edge of the glass substrate 11. As a result, the actual boarder of a liquid crystal display panel equals to the sum of "a+b+c", wherein "c" is a distance to an outer rim of an active displaying area 15 of the glass substrate 12. Since the sealant 12 will extend outward with a distance b with the existing method because of the overlapping of the beginning point and the final end, it inevitably creates a comparably large boarder. This is detrimental to the industry trend of providing a narrowed liquid crystal display panel.

SUMMARY OF THE INVENTION

In order to resolve the prior art issue, the present provides a method for deploying sealant to the glass substrates so as to reduce the boarder of the liquid crystal display panel.

The technical solution provided by the present invention is to introduce a method for applying sealant to seal a liquid crystal display panel, comprising the step of deploying the sealant along a predetermined path along the peripheral of a first substrate from a starting stroke. Wherein when the final stroke of deployment of the sealant closes to the starting stroke, diverting the sealant inward to inner side of the first glass substrate such that a final stroke of the sealant is juxtaposed with the starting stroke of the sealant. The final stroke closes to an inner side of the first substrate.

Wherein the starting stroke and the final stroke of the sealant constitute an enclosed pattern.

Wherein the inner side of the first substrate is the side which is closer to an active displaying area of the glass panel.

Wherein characterized in that it further comprises the step of deploying the sealant onto a second substrate and then marry the first and second substrates.

Wherein the first and second substrates are glass substrates, respectively.

Wherein the first substrate is one of the thin-film-transistor substrate and the color film substrate, and the second substrate is the other one of the thin-film-transistor substrate and the color film substrate.

The present invention provides another technical solution by introducing a method for applying sealant to seal a liquid crystal display panel, characterized in that the method includes the steps of a) deploying the sealant along a predetermined path along the peripheral of a first substrate from a starting stroke. Wherein when a final stroke of the deployment of the sealant closes to the starting stroke, diverting the sealant inward to inner side of the first glass substrate such that a final stroke of the sealant is juxtaposed with the starting stroke of the sealant. Wherein the final stroke of the sealant is closer to inward of the substrate; and b) marrying the substrate with another substrate so to construct a one-piece configuration.

Wherein the glass substrates are the thin-film-transistor substrate and the color film substrate, respectively.

The present invention can be concluded with the following advantages. As compared to the existing prior art, during the deployment of the sealant along its predetermined path, the final stroke of the sealant will not extend beyond the first stroke while stays inside of the first stroke so as to effectively narrow the width of the boarder. This arrangement meets and satisfy the trend of narrowed-boarder of the liquid crystal display panel.

BRIEF DESCRIPTION OF DRAWINGS

FIG. 1 is an illustrational view of a method for sealing a liquid crystal display panel.

DETAILED DESCRIPTION OF PREFERRED EMBODIMENT

A detailed description will be given along with the accompanied drawings.

Figure 1A:
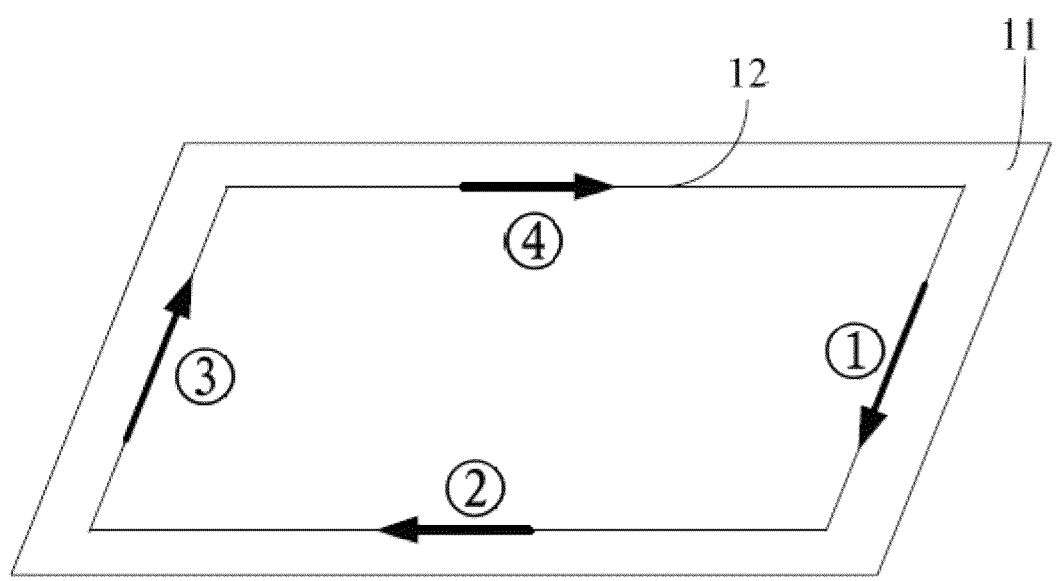
FIG. 1a illustrates a sequence for applying a sealant along peripheral boarder of the liquid crystal display.
Figure 1B:
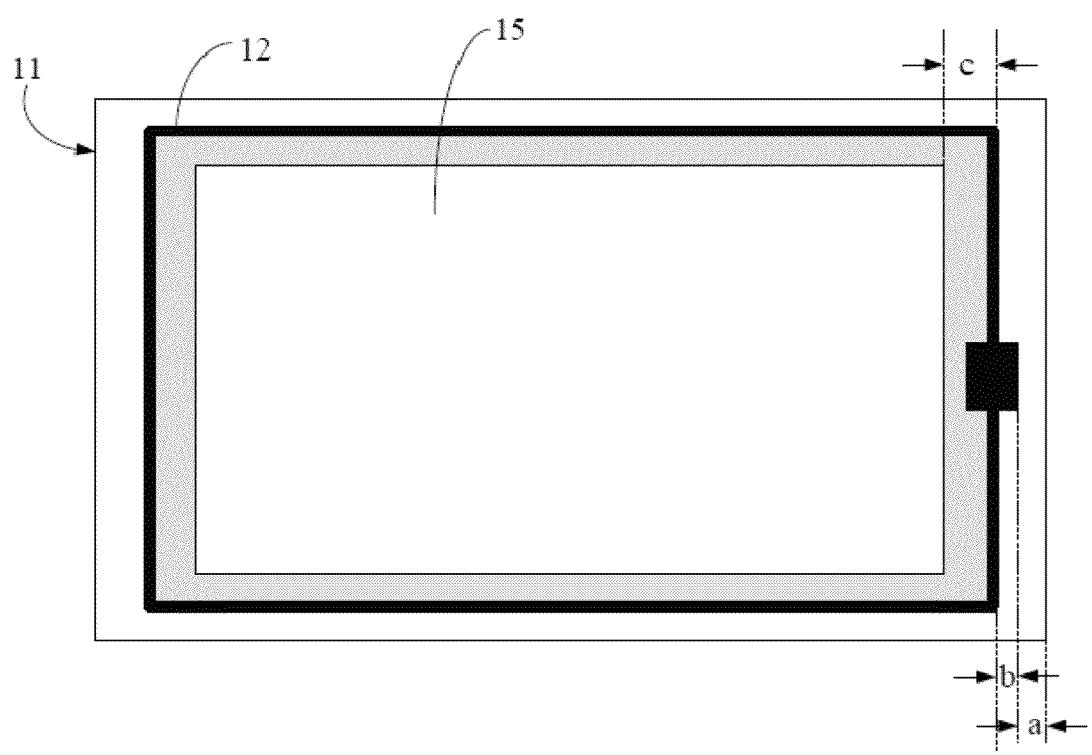
FIG. 1b is an illustrational view showing the liquid crystal display panel after the sealant is applied.
Figure 2A:
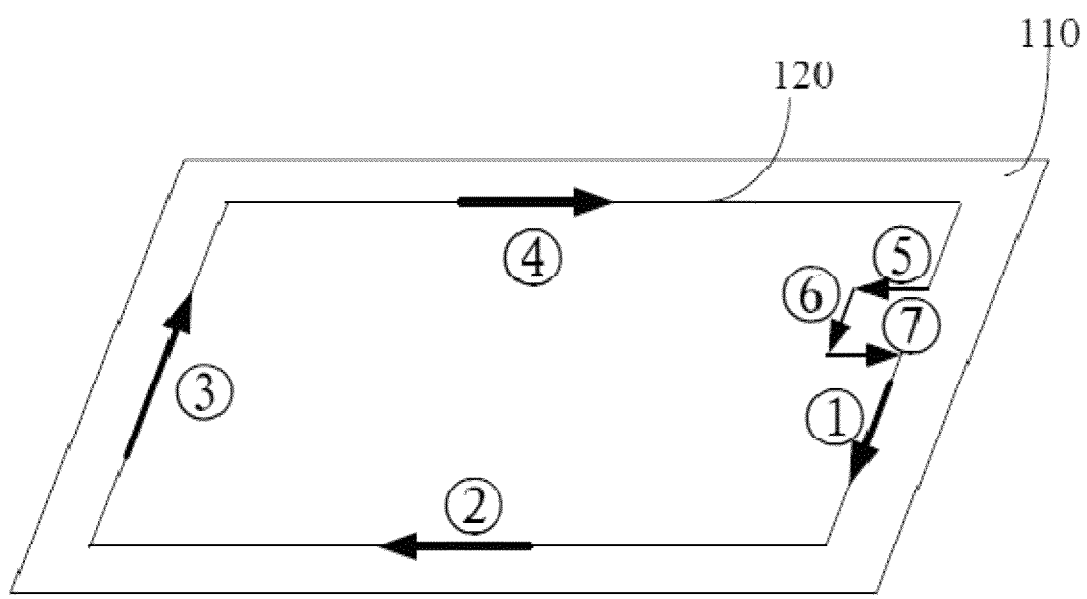
FIG. 2a illustrates a sequence for applying a sealant along peripheral boarder of the liquid crystal display panel made in accordance with the present invention.
Figure 2B:
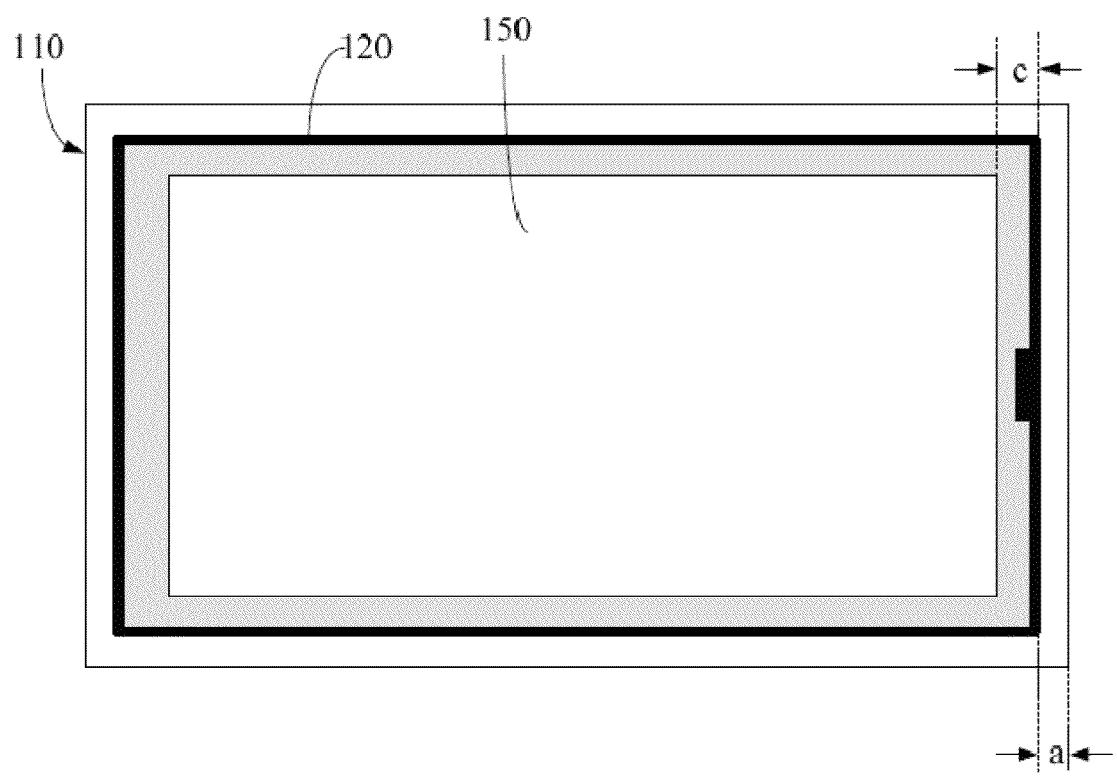
FIG. 2b is an illustrational view showing the liquid crystal display panel after the sealant is applied in accordance with the present invention.

FIG. 2a illustrates a sequence for applying a sealant along peripheral boarder of the liquid crystal display panel made in accordance with the present invention; and FIG. 2b is an illustrational view showing the liquid crystal display panel after the sealant is applied in accordance with the present invention.

As shown in FIGS. 2a and 2b, the sealing method for the liquid crystal display panel includes the following steps.

Applying a sealant 120 along a predetermined path on one of the substrate 110 so as to create an enclosed pattern. During the deployment, a final stroke will be diverted inward such that the final stroke is in parallel and juxtaposed to a first stroke. The repeated stroke or final stroke is closer toward an inner side of the substrate 110.

Afterward, marry a second or another substrate over the substrate 110 deployed with the sealant 120 to complete the sealing of the substrates. It should be noted that the substrates are all glass substrates, i.e. the thin-film-transistor substrate and the color film substrate, respectively.

In the current embodiment, as shown in FIG. 2a, the deployment of the sealant 120 can be divided into first, second, third, fourth strokes, and when the final stage is close, the process is further divided into fifth, sixth and seven strokes which make the sealant 120 offset inwardly and in parallel to the first stroke. Accordingly, the overlapped sealant, specially represented by the sixth stroke will be located inwardly the first stroke instead of external of the first stroke. By this arrangement, the final deployment of the sealant 120 will just extend toward an active displaying area 150, while will not extend toward outer peripheral of the substrate 110.

As shown in FIG. 2b, the sealant 120 will not extend toward the peripheral of the substrate so as to create a distance "b" as prior arts suffer. Accordingly, the width of boarder made in accordance with the present invention becomes "a+c", wherein "c" is a distance between an outer rim of the active displaying area with the inner edge of the final stroke of the sealant 120. Accordingly, the present invention can effectively narrow the boarder of the liquid crystal display panel, meeting the industry trend of the liquid crystal display panel.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A method for applying sealant to seal a liquid crystal display panel, comprising the step of deploying the sealant along a predetermined path along the peripheral of a first substrate from a starting stroke, wherein when the final stroke of deployment of the sealant closes to the starting stroke, diverting about 90 degrees of the final stroke of the sealant inward to inner side of the first glass substrate, turning about ninety degrees to in parallel to the first stroke, and then turning 90 degrees toward the first stroke, such that a final stroke of the sealant is juxtaposed with the starting stroke of the sealant, and wherein the final stroke closes to an inner side of the first substrate.

2. The method as recited in claim 1, wherein the starting stroke and the final stroke of the sealant constitute an enclosed pattern.

3. The method as recited in claim 1, wherein the inner side of the first substrate is the side which is closer to an active displaying area of the glass panel.

4. The method as recited in claim 1, characterized in that it further comprises the step of:
   deploying the sealant onto a second substrate and then marry the first and second substrates.

5. The method as recited in claim 4, wherein the first and second substrates are glass substrates, respectively.

6. The method as recited in claim 5, wherein the first substrate is one of the thin-film-transistor substrate and the color film substrate, and the second substrate is the other one of the thin-film-transistor substrate and the color film substrate.

7. A method for applying sealant to seal a liquid crystal display panel, characterized in that the method includes the steps of:
   a) deploying the sealant along a predetermined path along the peripheral of a first substrate from a starting stroke, wherein when a final stroke of the deployment of the sealant closes to the starting stroke, diverting about 90 degrees of the final stroke of the sealant inward to inner side of the first glass substrate, turning about ninety degrees to in parallel to the first stroke, and then turning 90 degrees toward the first stroke, such that a final stroke of the sealant is juxtaposed with the starting stroke of the sealant, wherein the final stroke of the sealant is closer to inward of the substrate; and
   b) marrying the substrate with another substrate so to construct a one-piece configuration.

8. The method as recited in claim 7, wherein the glass substrates are the thin-film-transistor substrate and the color film substrate, respectively.

* * * * *